Oct. 22, 1963  C. F. RUFF  3,107,528
METER FOR REGISTERING SELECTED-RATE FLOW VOLUME
Filed March 10, 1960

United States Patent Office 3,107,528
Patented Oct. 22, 1963

3,107,528
METER FOR REGISTERING SELECTED-RATE FLOW VOLUME
Charles F. Ruff, New York, N.Y.; Girard Trust Corn Exchange Bank and John Keen Ruff, executors of said Charles F. Ruff, deceased
Filed Mar. 10, 1960, Ser. No. 14,107
2 Claims. (Cl. 73—272)

This invention relates to fluid flow meters, and more particularly to such meters which register volume of flow therethrough taking place under flow rate conditions above a predetermined minimum flow rate.

One object of the present invention is to make possible a surcharge on users of water for other than normal purposes. Heavy occasional consumer demands, as for air conditioners and lawn sprinklers, impose special burdens of expansion of reservoirs and other water facilities. It is desirable thus that consumers making such unusual demands on the water supply be charged at a higher rate for the water so used. It is an object of the invention to provide novel means for registering not only the total volume of flow, for which charges may be made at the usual rates, but additionally the volume of flow taking place at higher rates, for which a suitable surcharge may then be charged.

A further object is to provide such a meter in which there are two registering indicators, one for each of the purposes above described, one being driven continuously by flow of fluid through the meter, and the other being driven only during periods when rate of flow is above a predetermined minimum.

A further object is to provide such a meter in which there is centrifugally actuated clutch means operating when flow rate rises above the predetermined minimum to engage the previously idle register and thereupon cause the same to be driven until flow rate again drops below said predetermined minimum.

Further objects are to provide such clutch means which effect engagement with the second register accurately when flow rate reaches the predetermined amount, and effect disengagement when flow rates drop therebelow; which will not tend to stick, jam, or otherwise become inoperative; and which will not slip or otherwise cause inaccurate registering.

Other objects, advantages, and features will appear from the following description of preferred embodiments of the invention, taken in conjunction with the attached drawings thereof, in which.

Figure 1:
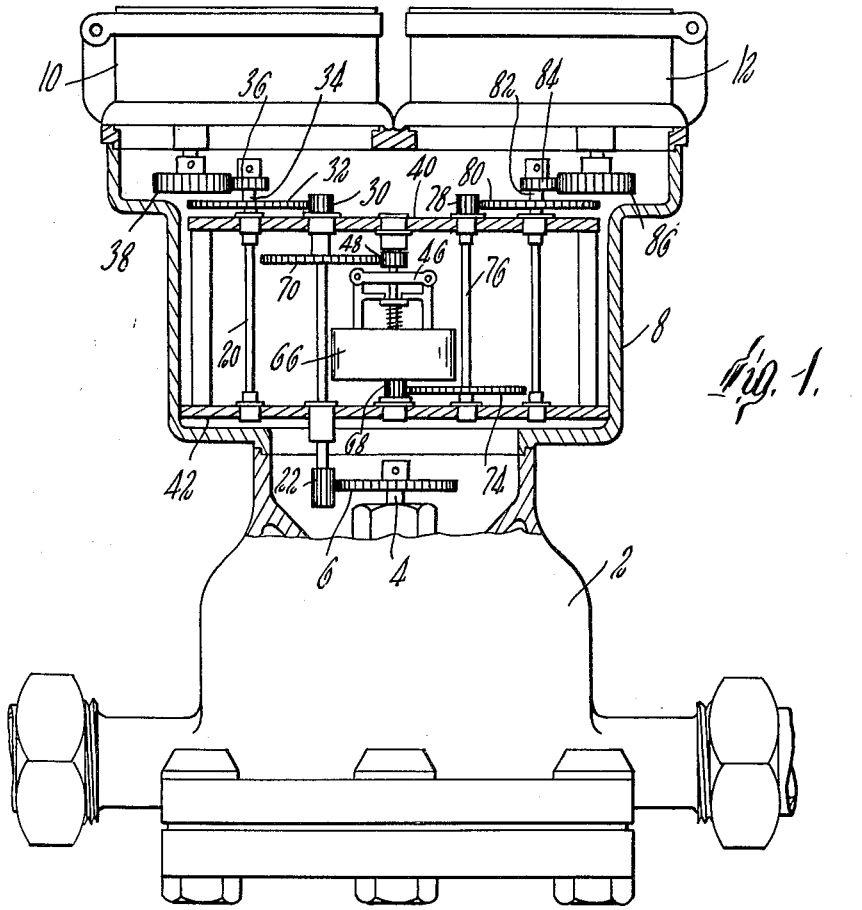
FIG. 1 is a side elevation, partially in section, of a preferred embodiment of the invention.
Figure 2:
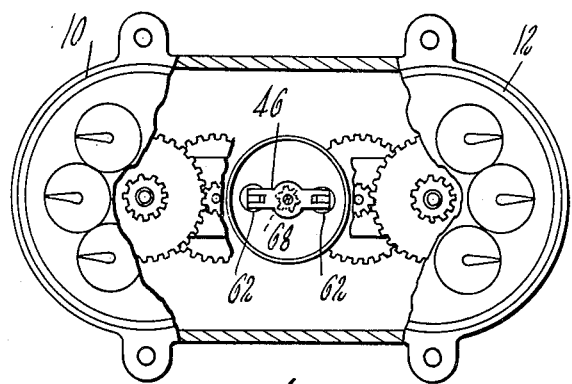
FIG. 2 is a plan view, partially broken away, of said embodiment of the invention.
Figure 3:
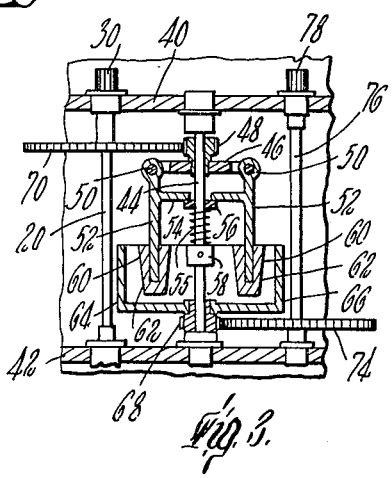
FIG. 3 is a partial sectional view of said embodiment.

Referring now to the drawings, there is shown a meter-casing 2 containing mechanism to impart rotation to spindle 4, proportionate to flow volume therethrough.

The total flow volume register 10 is continuously driven during flow conditions from spindle 4, through gear 22, which turns shaft 20 and gear 30 mounted thereon. The latter gear turns gear 32, which through shaft 34 turns gear 36, and the latter turns gear 38 to drive the register 10. Gears 36 and 38 are the change gears.

Rigidly positioned within the upper housing 8 are an upper mounting plate 40 and a lower mounting plate 42. Non-rotatably mounted therebetween is spindle 44. Rotatably mounted on spindle 44 is cross-head 46, which has rigidly secured thereto gear 48. At each end of cross-head 46, dangling freely on pivot supports 50, are pendulum arms 52; and extending inwardly from each thereof is a pin 54. Urged upwardly against the pins 54 by a spring 55 is a ring 56. The spring compression is adjustable by means of slidable collar 58, which can be positioned at the place desired on spindle 44 by means of a set screw. At the lower extremities of the pendulum arms 52 are secured weights 60, the outer surfaces 62 of which are tapered so that when the arms 52 swing out on pivots 50, said outer surfaces will lie along the inner peripheral surface 64 of clutch cup 66, which is rotatably mounted on spindle 44, and to the lower portion of which is secured gear 68, also rotatably mounted on spindle 44.

The gear 48 is continuously driven during flow conditions by gear 70, which is mounted on shaft 20. Compression on the spring 55 is adjusted so that when a rate of rotation of the cross-head 46, attached to gear 48, corresponding with a predetermined minimum flow rate is achieved, the arms 52 are swung outwardly by centrifugal force overcoming the spring 55, so that the surfaces 62 of the weights 60 engage the inner peripheral surface 64 of the clutch cup 66, and frictionally drive the latter. This in turn rotates gear 68, rigidly associated with the clutch cup, and the gear 68 drives gear 74, which turns shaft 76 and the gear 78 mounted thereon. The latter drives register gear 86 through gear 80, shaft 82, and gear 84.

Gear sizes are adjusted to produce high rotation rate of the cross-head 46 and associated pendulum arms and weights. For example, if spindle 4 is rotating at 3 r.p.m., shaft 20 may be made to rotate at 30 r.p.m., and the cross-head 46 at 300 r.p.m. Then shaft 76 may be operated at 30 r.p.m., and finally shaft 82 at 3 r.p.m.

Operation of this embodiment will be clear from the description above given. The pendulum weights and clutch cup may suitably be of brass or other corrosion-resistant metal. The pins 54 of course move along the ring 56 as the arms 52 ride outwardly. However, since the pins 54 never ride off the ring 56, the force of the spring 55 is at all times exerted therethrough on the arms 52. Thus, whenever rotation rate of the cross-head 46 drops below that corresponding to the predetermined minimum flow rate, the surfaces 62 are disengaged from the surface 64, to bring to a halt driving of the register gear 86 and high-rate flow volume register 12.

The invention is useful not only on water meters having a single register for registering total flow volume, but on compound meters as well. Normally it will be desirable to use the high-rate volume register of the invention in association with the volume register which becomes operative at the higher rates of flow.

Other embodiments within the spirit of the invention will occur to those skilled in the art, the embodiments described being illustrative merely.

I claim:

1. In a liquid flow volume meter for separately registering both total volume of flow and volume of flow taking place at rates above a predetermined minimum flow rate and including measuring mechanism which imparts rotation to a spindle at a first angular velocity, said first angular velocity being directly proportionate to rate of flow through said meter and generating at said predetermined minimum flow rate a relatively low centrifugal force, the combination which comprises a total flow volume register operatively connected with said spindle to be continuously driven thereby during flow conditions, intermediate means for converting said first angular velocity into a second and increased angular velocity generating a relatively higher centrifugal force, support means connected with said intermediate means for rotation thereby at said second angular velocity, weighted means movably carried by said support means for rotation thereby at said second angular velocity, driven means spaced from said weighted means at angular velocities below the angular velocity corresponding to said predetermined minimum flow rate and engageable therewith at angular velocities thereabove, and a high rate flow volume register operatively connected with said driven means for recording volume of flow at rates above said predetermined rate.

2. In a liquid flow volume meter for separately registering both total volume of flow and volume of flow taking place at rates above a predetermined minimum flow rate and including measuring mechanism which imparts rotation to a spindle directly proportionate to the total volume of flow, the combination which comprises a total flow volume register operatively connected with said spindle to be continuous rotatably driven thereby during flow conditions, a horizontal cross-head operatively connected with said spindle to be continuously rotatably driven about a vertical axis thereby during flow conditions, at a higher angular velocity than the angular velocity of said spindle, a pair of pendulum arms pivotally dependent from opposing ends of said cross-head, each said pendulum arm having secured to the lower end thereof a weight, biasing means associated with said pendulum arms to prevent their swinging outwardly fully until activated by a centrifugal force corresponding to said predetermined rate of flow, a clutch cup the inner peripheral surface of which is normally sidewise displaced from said weights for frictional engagement thereby to drive said clutch cup when said weights swing outwardly thereagainst, and a high-rate flow volume register operatively connected with said clutch cup to be driven by the same to record volume of flow at rates above said predetermined rate.

References Cited in the file of this patent
UNITED STATES PATENTS

| | | |
|---|---|---|
| 1,195,930 | Shipman | Aug. 22, 1916 |
| 2,943,484 | Harrington et al. | July 5, 1960 |

FOREIGN PATENTS

| | | |
|---|---|---|
| 381,895 | France | Nov. 23, 1907 |